United States Patent
Okajima et al.

(10) Patent No.: US 6,916,535 B2
(45) Date of Patent: Jul. 12, 2005

(54) POLY (TRIMETHYLENE TEREPHTHALATE) PELLETS AND METHOD FOR PRODUCTION THEREOF

(75) Inventors: Shinichi Okajima, Nobeoka (JP); Jinichiro Kato, Nobeoka (JP); Katsuhiro Fujimoto, Nobeoka (JP)

(73) Assignee: Asahi Kasei Kabushiki Kaisha, Osaka (JP)

(*) Notice: Subject to any disclaimer, the term of this patent is extended or adjusted under 35 U.S.C. 154(b) by 342 days.

(21) Appl. No.: 10/133,398

(22) Filed: Apr. 29, 2002

(65) Prior Publication Data

US 2003/0092874 A1 May 15, 2003

(30) Foreign Application Priority Data

Oct. 11, 2001 (JP) .......................... 2001-313993

(51) Int. Cl.⁷ ............................ B32B 15/02; C08F 20/00
(52) U.S. Cl. ........................ 428/402; 528/481; 528/491; 525/444
(58) Field of Search ................. 528/481, 491, 528/492, 503; 525/444, 437; 428/402

(56) References Cited

U.S. PATENT DOCUMENTS

| | | | |
|---|---|---|---|
| 6,093,786 A | 7/2000 | Kelsey | 528/271 |
| 6,242,558 B1 | 6/2001 | Kelsey | 528/206 |
| 6,441,129 B2 * | 8/2002 | Duh et al. | 528/503 |
| 2001/0056172 A1 | 12/2001 | Duh et al. | 528/272 |

FOREIGN PATENT DOCUMENTS

| | | |
|---|---|---|
| JP | 2000159875 | 6/2000 |
| JP | 2000-159875 | 6/2000 |
| WO | WO 97/23543 | 7/1997 |
| WO | WO 98/23662 | 6/1998 |
| WO | WO 99/11709 | 3/1999 |

* cited by examiner

*Primary Examiner*—Samuel A. Acquah
(74) *Attorney, Agent, or Firm*—Finnegan, Henderson, Farabow, Garrett & Dunner, L.L.P.

(57) ABSTRACT

The present invention provides a poly(trimethylene terephthalate) pellet comprising 80 wt % or more of trimethylene terephthalate repeating units copolymerized with bis(3-hydroxypropyl) ether at a ratio in a range from 0.01 to 2 wt %, wherein an amount of terminal carboxyl groups is 25 milli-equivalent/kg or less and an intrinsic viscosity is in a range from 0.8 to 2 dl/g, which pellet has an $L^*$ value of 75 or more, a $b^*$ value in a range from −2 to 5, and a weight in a range from 1 to 50 mg/piece.

11 Claims, No Drawings

POLY (TRIMETHYLENE TEREPHTHALATE) PELLETS AND METHOD FOR PRODUCTION THEREOF

TECHNICAL FIELD

The present invention relates to poly(trimethylene terephthalate) pellets and a method for the production thereof.

BACKGROUND ART

Poly(trimethylene terephthalate) fiber (hereinafter poly (trimethylene terephthalate) is referred to as PTT) is surprisingly excellent in soft feeling, drapability, stretchability, low-temperature dyeability, weather resistance or others, and has numerous characteristics superior to the existing synthetic fibers such as poly(ethylene terephthalate) fiber (hereinafter poly(ethylene terephthalate) is referred to as PET) or nylon 6 fiber.

The present applicant has overcome numerous difficulties relating to the polymerization or spinning of PTT, the processing of PTT fiber, the merchandising thereof or the like and has recently marketed PTT fiber for the first time in the world (under the trade name "Solo").

PTT is obtained by the polycondensation of terephthalic acid or lower alcohol ester of terephthalic acid with 1,3-propanediol (also called as trimethylene glycol; hereinafter 1,3-propanediol is referred to as PDO).

Elementary processes constituting the polycondensation reaction of PTT mainly comprise the following reactions. The forward reaction is a chain propagation caused by the de-PDO (PDO removal reaction) of two terminal hydroxyl groups (see the following formula (a)). The backward reaction is a reaction in which an ester portion is decomposed with undischarged PDO (that is, the backward reaction of the formula (a)) and the thermal decomposition of the ester portion (see the following formula (b)). In this regard, in the formula (a), k1 is a reaction rate constant in the rightward reaction and k2 is a reaction rate constant in the leftward reaction. Also, in the formula (b), kd is a reaction rate constant in the rightward reaction.

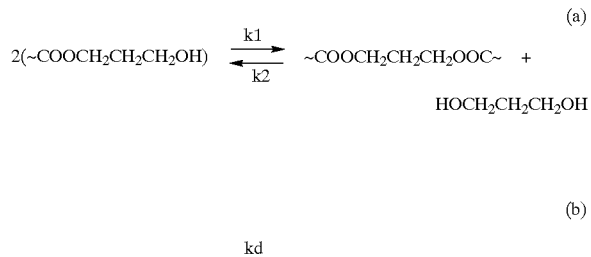

As PTT is more easily thermal-decomposable than PET or polybutylene terephthalate (hereinafter referred to as PBT) having a skeleton similar to that of PTT (in other words, as PTT has a larger kd), it is difficult to increase the molecular weight solely by the melting polymerization. Accordingly, to obtain PTT having a high molecular weight, both the melting polymerization and the solid-state polymerization are usually used, in which prepolymer having a low molecular weight is first produced by the melting polymerization and once cooled and solidified, and then, the polycondensation is carried out at a temperature of the melting point of the prepolymer or lower.

However, there are various problems in the melting polymerization or the solid-state polymerization of PTT due to the polymer properties inherent to PTT.

First, PTT is liable to be thermally decomposed in the melting process. As PTT has a larger kd in the above formula (b), the viscosity thereof is liable to lower in the melting state. Molecular terminal carboxyl groups or molecular terminal aryl groups created by the thermal decomposition in the melting state further accelerate the thermal decomposition to cause the deterioration of the degree of whiteness or the antioxidation stability of PTT. Thus, in the production process of PTT, it is necessary to suppress the thermal decomposition as much as possible for the purpose of obtaining high-quality PTT. Such a problem, however, has not been satisfactorily solved in the prior art.

Second, PTT pellets are easily cracked or powdered. For example, when the pellets are rubbed against each other during the solid-state polymerization, drying or transportation, they are relatively easily cracked or powdered. Particularly, if the PTT pellets are cracked or powdered during the solid-state polymerization, various problems are generated in the spinning, film-forming or molding process, such as the generation of yarn breakage, fluff or fish eye.

That is, since the powdery PTT has a large surface area, if it is mixed with the pellets and subjected to the solid-state polymerization, the discharge of PDO in the above formula (a) is excessively effectively carried out, which results in a higher molecular weight in comparison with the pellet-shaped PTT and thus in an extraordinary high melting viscosity. Accordingly, if the PTT obtained by the solid-state polymerization is used for the melt-molding process, the powdery material thus having a high molecular weight is not completely melted during the melt-molding process to cause the irregular melting state of polymer, resulting in yarn breakage or fluff in the spinning process. Also, the powdery material adheres to an interior wall of a vessel for the solid-state polymerization and dwells there for a long period to cause the thermal deterioration or color development. If this material is discharged, the color or the antioxidation stability of the melt-mold product may be degraded. To avoid such problems, cracked or powdered pellets may be removed prior to being melt-molded. However, this needs a removal process and, if a large amount of such pellets is generated, the loss of raw material becomes significant to push up the production cost.

The two above-mentioned problems hardly occur in PET and PBT although they have a chemical structure similar to that of PTT. This is because these polymers have a constant of thermal decomposition rate corresponding to a kd much smaller than that of PTT as well as an amount of powdery material generated when the pellets of such polymers are rubbed against each other is very small. In other words, the above-mentioned problems are peculiar to PTT and, therefore, it is very difficult to think of a solution for this problems from the descriptions in known documents relating to PET and PBT. Also, there is neither disclosure nor suggestion for solving these problems in known documents relating to the polymerization of PTT.

For example, in Japanese Unexamined Patent Publication No. 2000-159875, a method is proposed, in which polymer having a small amount of terminal vinyl groups obtained by the melt-polycondensation while using a mixed catalyst of Ti and Mg in a certain state is subjected to the solid-state polymerization in an inert gas atmosphere to result in high-quality PTT. However, according to this method, the resultant pellet is dull in hue and low in L* value in a range from approximately 60 to 70 because Mg is used as a catalyst. There is nothing about the generation of powdery material or, of course, a suggestion of a solution thereto.

WO97/23543 discloses a method, in which non-pelletized PTT having a low polymerization degree is melted and dropped on a hot plate, so that it is crystallized at a temperature in a range from 60 to 190° C. to form solid PTT having crystallites of a size of 18 nm or more, which is then subjected to the solid-state polymerization. PTT obtained by this method, however, has a rough surface and is liable to generate powder when rubbed. Also, there is no disclosure of a technique for improving the color tone and the antioxidation stability in this description.

In the US patent 2001/0056172-A1, a method for the solid-state polymerization of PTT pellets is described. In this method, however, the solid-state polymerization technique generally used for obtaining PET is merely applied to PTT, and there is neither the recognition of problems peculiar to PTT, such as the deterioration of whiteness and antioxidation stability or the generation of powdery material, nor the solution thereof.

In Embodiment 8 of WO98/23662, a method is disclosed, in which the solid-state polymerization is carried out after PTT terminal-sealed with hindered phenolic type stabilizer has been pelletized. Also, in Embodiment 8 of WO99/11709, a method is disclosed, in which the solid-state polymerization is carried out after PTT containing phosphor type stabilizer has been pelletized. In these methods, however, there is neither the recognition of problems such as the deterioration of antioxidation stability or the generation of powdery material, nor a solution thereto.

DISCLOSURE OF THE INVENTION

A subject of the present invention is to provide a PTT pellet free from the generation of cracking or powdery material and excellent in whiteness and antioxidation stability, to provide a PTT prepolymer pellet capable of obtaining a high-quality PTT pellet not discolored and free from the generation of crack or powdery material during the solid-state polymerization, and to provide a method for the production thereof.

To solve the above problems, the present inventors have studied in detail the melt polymerization and the solid-state polymerization reaction of PTT and found that the above problems could be solved by the solid-state polymerization of a PTT prepolymer pellet less in thermal decomposition and having a small particle size, preferably while discharging water and PDO which are byproducts of the polymerization at a high efficiency. Thus, the present invention has been reached.

That is, the present invention is as follows:

1. A PTT pellet satisfying the following items (1) to (7):
   (1) the PTT comprises trimethylene terephthalate repeating units of 80 wt % or more,
   (2) the PTT has bis(3-hydroxypropyl) ether copolymerized at a ratio in a range from 0.01 to 2 wt %,
   (3) the PTT has an amount of terminal carboxyl groups of 25 milli-equivalent/kg or less,
   (4) the PTT has an intrinsic viscosity in a range from 0.8 to 2 dl/g,
   (5) the pellet has an L* value of 75 or more,
   (6) the pellet has a b* value in a range from −2 to 5, and
   (7) a weight of the pellet is in a range from 1 to 50 mg/piece.

2. A PTT pellet as defined by claim 1, wherein the content of trimethylene terephthalate cyclic dimer is 1.5 wt % or less.

3. A PTT pellet as defined by claim 1 or 2, wherein a specific surface area per a piece of the pellet is in a range from 10 to 50 cm$^2$/g.

4. A PTT pellet as defined by claim 1, wherein the degree of crystallization is in a range from 40 to 60%.

5. A PTT pellet as defined by claim 1, wherein the Vickers hardness is in a range from 10 to 30 kg/mm$^2$.

6. A method for producing a PTT pellet by the solid-state polymerization of PTT prepolymer pellet satisfying the following items (1) to (7):
   (1) the PTT prepolymer comprises trimethylene terephthalate repeating units of 80 wt % or more,
   (2) the PTT prepolymer has bis (3-hydroxypropyl) ether copolymerized at a ratio in a range from 0.01 to 2 wt %,
   (3) the PTT prepolymer has an amount of terminal carboxyl groups of 35 milli-equivalent/kg or less,
   (4) the PTT prepolymer has an intrinsic viscosity in a range from 0.1 to 1 dl/g,
   (5) the prepolymer pellet has an L* value of 75 or more,
   (6) the prepolymer pellet has a b* value in a range from −3 to 6, and
   (7) a weight of the prepolymer pellet is in a range from 1 to 50 mg/piece.

7. A method for producing a PTT pellet as defined by claim 6, wherein the solid-state polymerization is carried out in an inert gas stream under the following conditions (1) and (2):
   (1) the solid-state polymerization temperature is in a range from 190 to 220° C.
   (2) the superficial velocity of the inert gas is 10 cm/min or more.

8. A method for producing a PTT pellet as defined by claim 6, wherein the solid-state polymerization is carried out at a negative pressure under the following conditions (1) and (2):
   (1) the solid-state polymerization temperature is in a range from 190 to 220° C., and
   (2) the degree of vacuum is 30 kPa or less.

9. A method for producing a PTT pellet as defined by any one of claims 6 to 8, wherein the solid-state polymerization is carried out after the degree of crystallization in a range from 20 to 60% is obtained by the heat treatment.

10. A method for producing a PTT pellet as defined by any one of claims 6 to 9, wherein the solid-state polymerization is of a continuous type or a batch type.

11. A melt-mold product using a PTT pellet defined by any one of claims 1 to 5.

The present invention will be described in detail below.

The pellet according to the present invention comprises PTT. The pellet is also referred to as a chip and has a particle shape so that melt-molding is easily carried out.

In the present invention, PTT is a polymer comprising 80 wt % or more of trimethylene terephthalate repeating units. A comonomer at 20 wt % or less, preferably 10 wt % or less of the repeating units, other than terephthalic acid and PDO, may be copolymerized therewith.

The comonomer may be oxalic acid, succinic acid, adipic acid, sebacic acid, dodecanoic acid, didodecanoic acid, cyclohexane dicarbonic acid, ethylene glycol, butane diol, hexane diol, cyclohexane diol, cyclohexane dimethanol, trimethylene glycol dimer, polyalkylene glycol having an average molecular weight in a range from 400 to 20000 or others, which are used individually or in combination with the others. In this regard, although sulfonate may be used as a comonomer, the use thereof is undesirable because the polymerization is retarded during the melt-polymerization process as well as a yarn strength becomes lower.

The PTT pellet according to the present invention may be added with various additives such as a delusterant, a heat stabilizer, a defoamer, a color shade adjuster, a flame retardant, an antioxidant, an ultraviolet absorber, an infrared absorber, a crystallizing nucleus, a fluorescent whitener or the like, which additives may be copolycondensated or mixed. The delusterant is preferably titanium oxide, the content of which is preferably in a range from 0.01 to 3 wt % relative to the pellet because the generation of cracks or powdery material is minimized and the friction decreases when molded. To suppress the thermal decomposition during the polymerization process, a heat stabilizer is preferably used. Particularly, phosphorous compound such as phosphoric acid, trimethyl phosphate or triethyl phosphate is added to the pellet in a range from 2 to 250 ppm, preferably from 10 to 100 ppm as an amount of phosphorus element. For the same purpose, a hindered phenolic type antioxidant may be added to the pellet in a range from 0.01 to 1 wt %. Further, to prevent the discoloration, the color shade adjuster such as cobalt acetate, cobalt formate or a fluorescent whitener may be added to the pellet in a range from 0.0001 to 0.05 wt %.

The PTT pellet according to the present invention has the intrinsic viscosity in a range from 0.8 to 2 dl/g, preferably from 0.8 to 1.5 dl/g. If the intrinsic viscosity is within this range, no cracks or powdery material are generated in the pellet to result in a mold product excellent in strength and durability and the stable melt-spinning.

The PTT pellet according to the present invention has the L* value of 75 or more, preferably 80 or more, more preferably 85 or more, and the b* value in a range from −2 to 5, preferably from −1 to 5, more preferably from −1 to 4. The L* value and the b* value are indexes of color tone indicated in a CIE-L*a*b* color model (CIE1976). The L* value represents the brightness, and if this value becomes larger, the brightness is more stressed. The b* value represents the yellowness, and if this value becomes larger, the yellowness is more stressed. When both the L* value and the b* value are within the above-mentioned range, a product which is colored with dye or pigment and excellent in color development and color clearness is obtained.

The PTT pellet according to the present invention has a weight in a range from 1 to 50 mg/piece. Within this range, the pellet is not easily cracked but smoothly fed into a screw of an extruder. Also, as the pellet hardly contains the atmospheric gas therein in the interior of the single-screw type extruder usually used for the melt-spinning, no yarn breakage or fluff generates. To minimize the generation of cracks or powdery material in the pellet and facilitate the solid-state polymerization for a short period at a low temperature, the pellet has a weight preferably in a range from 1 to 30, more preferably from 1 to 25, mg/piece.

A specific surface area per one pellet is preferably in a range from 10 to 50 cm$^2$/g, more preferably from 20 to 50 cm$^2$/g. Within this range, the discharge efficiency of PDO is favorable and the melt-moldability is excellent.

The PTT pellet according to the present invention has PTT terminal carboxyl groups of 25 milli-equivalent/kg or less, preferably in a range from 0 to 15 milli-equivalent/kg. If the terminal carboxyl groups is 25 milli-equivalent/kg or less, no discoloration occurs during the heating and the antioxidation stability is excellent.

The PTT pellet according to the present invention is copolymerized with bis(3-hydroxypropyl) ether (i.e., a dimer of PDO; hereinafter referred to as BPE) in a range from 0.01 to 2 wt % relative to the PTT, preferably from 0.05 to 1.5 wt %, more preferably from 0.15 to 1.5 wt %, furthermore preferably from 0.3 to 1.5 wt %. By copolymerizing BPE, the light resistance or the antioxidation stability of the PTT is liable to lower, but if the copolymerization ratio is proper, there is an effect in that the dye-exhaustion ratio or the spinning stability is improved. Accordingly, if BPE is copolymerized in the above-mentioned range, there is no problem in the light resistance and the antioxidation stability, while the dyeability is improved. Also, since the crystallization is properly prevented so that the excessive crystallization is suppressed during the solid-state polymerization process, the generation of cracks or powdery material of the pellet is minimized.

According to the PTT of the present invention, the content of cyclic dimer in which trimethylene terephthalate unit is dimerized is preferably 1.5 wt % or less relative to PTT, more preferably 1.2 wt % or less, furthermore preferably 0.7 wt % or less, most preferably 0%. If the content is 1.5 wt % or less, no cyclic dimer precipitates during the spinning or dyeing, whereby the generation of yarn breakage or fluff is prevented as well as no dyeing speck occurs. In this regard, the cyclic dimer has the following chemical structural formula:

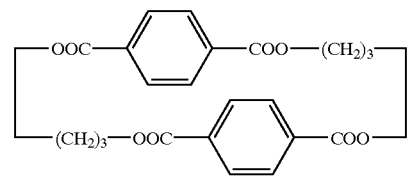

The PTT pellet according to the present invention has the degree of crystallization preferably in a range from 40 to 60%, more preferably from 45 to 55%. Within this range, no crack occurs in the pellet and no pellets are adhered to each other during the solid-state polymerization.

The PTT pellet according to the present invention has the Vickers hardness preferably in a range from 10 to 30 kg/mm$^2$, more preferably from 15 to 28 kg/mm$^2$. Within this range, no cracks occur in the pellet and no pellets are adhered to each other during the solid-state polymerization.

In the PTT pellet according to the present invention, the less powdery material adhered to or mixed with the pellet, the better the result. The powdery material is preferably 150 ppm relative to the pellet, more preferably 50 ppm or less. The powdery material is dust-size particles passing through a 50-mesh screen. If the powdery material is excessive, there may be a problem in that a blower or an exhaust fan of a pneumatic conveyor (Pneuma line) used for transporting the pellets is blocked thereby to cause the incorrect operation or the screw pressure is liable to fluctuate when the pellets are melted and extruded in the spinning or molding process. In this regard, the 50-mesh screen is one having 50 openings in 1 inch (2.54 cm) length; that is, a width of one opening is approximately 300 μm.

The PTT pellet according to the present invention is produced by the solid-state polymerization of a PTT prepolymer pellet (hereinafter referred merely to as a prepolymer pellet) satisfying the following requirements. In this regard, the prepolymer is a polymer prior to being subjected to the solid-state polymerization, having an intrinsic viscosity lower by at least 0.1 dl/g than the polymer obtained by the solid-state polymerization.

In the present invention, the prepolymer pellet has the intrinsic viscosity in a range from 0.1 to 1 dl/g, preferably from 0.2 to 1 dl/g, more preferably from 0.4 to 1 dl/g. If the intrinsic viscosity is within this range, it is possible to efficiently produce the PTT pellet by the solid-state polymerization for a short period, which is free from the generation of crack or powdery material in the pellet and has terminal carboxyl groups of 25 milli-equivalent/kg or less as well as has no difference in viscosity between inner and outer layer of the pellet and free from the discoloration.

The prepolymer pellet has the L* value of 75 or more, preferably 80 or more. When the L* value is 75 or more, the PTT pellet obtained by the solid-state polymerization of the prepolymer pellet also has a high L* value and is excellent in color tone. A b* value is in a range from −3 to 6, preferably from −1 to 5. If the b* value is within this range, the PTT pellet excellent in color tone is obtainable, in which a bluish or yellowish tone is not excessive.

According to the present invention, the prepolymer pellet has the weight in a range from 1 to 50 mg/piece, preferably from 1 to 30 mg/piece, more preferably from 1 to 25 mg/piece. Within this range, PDO is properly discharged from the pellet surface during the solid-state polymerization process to result in a pellet excellent in hue or antioxidation stability. Since the generation of crack or powder of the pellet is prevented and the partial fusion-bonding of the pellets does not occur, it is possible to mold a product in a stable manner when the pellets are supplied to the molding process.

An amount of the terminal carboxyl groups in the prepolymer pellet is 35 milli-equivalent/kg or less, preferably in a range from 0 to 25 milli-equivalent/kg for the purpose of suppressing the thermal decomposition during the solid-state polymerization as well as minimizing the discoloration of the PTT pellet after the solid-state polymerization. If this value is 35 milli-equivalent/kg or less, there is no discoloration of the prepolymer, and therefore the PTT pellet obtained by the solid-state polymerization is also hardly discolored and is excellent in antioxidation stability.

In the prepolymer pellet, BPE is copolymerized in a range from 0.01 to 2 wt %. A preferable range thereof and a reason therefor are the same as described above regarding the PTT pellet according to the present invention.

Next, a method for producing the prepolymer pellet will be explained.

The prepolymer pellet is produced by (1) an esterification reaction process in which terephthalic acid and/or lower alcohol ester of terephthalic acid is reacted with PDO to form bis(3-hydroxypropyl) terephthalate and/or oligomer thereof (hereinafter referred to as BHPT), (2) a polycondensation reaction process in which the reaction product thus obtained is heated to form the prepolymer while removing 1,3-propanediol, and (3) a pelletizing process in which the prepolymer obtained by the polycondensation reaction is pelletized.

First, the description will be made of (1) the esterification process.

An input ratio of PDO to terephthalic acid and/or lower alcohol of terephthalic acid is preferably in a range from 0.8 to 3, more preferably from 1.4 to 2.5, furthermore preferably from 1.5 to 2.3 represented by a molar ratio. If the input ratio is within this range, the esterification reaction is facilitated and a high grade white polymer having a suitable melting point is obtained by the subsequent polycondensation reaction process. For the purpose of obtaining the resultant PTT pellet having a favorable hue, a lower alcohol ester of terephthalic acid is preferably used as a raw material.

To facilitate the reaction, a catalyst is preferably used. The catalyst may be a titanium alcoxide represented by titanium tetrabutoxide or titanium tetraisopropoxide; a metallic oxide such as amorphous titanium oxide precipitate, amorphous titanium/silica co-precipitate or amorphous zirconia precipitate; metallic carbonate, such as calcium acetate, manganese acetate, cobalt acetate or antimony acetate; and a germanium compound such as germanium dioxide. An amount of the catalyst is preferably in a range from 0.01 to 0.2 wt % relative to a total amount of carbonic acid component monomer in view of the improvement of the degree of whiteness.

The reaction is carried out at a temperature approximately in a range from 200 to 250° C. while removing alcohol such as methanol formed as by-product. The reaction time is usually in a range from 2 to 10 hours, preferably from 2 to 4 hours.

Next, (2) the polycondensation reaction will be described.

In the polycondensation reaction, titanium alcoxide represented by titanium tetrabutoxide or titanium tetraisopropoxide; metallic oxide such as amorphous titanium oxide precipitate, amorphous titanium oxide/silica coprecipitate or amorphous zirconia precipitate; or a germanium compound such as germanium dioxide may be added if necessary, in a range from 0.01 to 0.2 wt % relative to a total amount of carbonic acid component monomer, and the polycondensation reaction is carried out in accordance to a known method. To obtain the prepolymer of the present invention, the polycondensation temperature is preferably in a range from 240 to 270° C., and the optimum polymerization time is selected so that an amount of terminal carboxyl groups in the prepolymer becomes 35 milli-equivalent/kg. Generally, this time is within 4 hours, preferably from 1 to 3 hours under the following degree of vacuum by the polymerization method described below. The polycondensation temperature is more preferably in a range from 250 to 265° C., and the degree of vacuum is preferably in a range from 0.0001 to 0.1 kPa.

In this regard, a time during which a normal pressure decreases to the negative pressure is important for the purpose of controlling the formation of BPE to a proper amount. This time is preferably within 50 minutes so that the formation of BPE is minimized. To suppress the heat decomposition and reduce the polycondensation reaction time, PDO is preferably efficiently removed in the polycondensation reaction. For this purpose, it is important to increase a specific surface area of the polymer. For example, a helical agitator or a disk-ring reactor is used while putting a raw material in a vessel at a ratio of 40 vol % or less, preferably 35 vol % or less relative to a capacity of a vessel, for effectively agitate the reaction product to form a film. Further, the polycondensation reaction is preferably stopped while the viscosity of the melted product at the polycondensation reaction stage is rising as the time passage. Since the melting viscosity does not rise any more but, rather, may lower even if the reaction time is prolonged, it is important to stop the polycondensation reaction before the viscosity lowers. This is because, in the case wherein the melting viscosity does not rise any more but, rather, may lower even if the reaction time is prolonged, the heat decomposition reaction becomes predominant over the polymerization reaction to increase an amount of terminal carboxyl groups generated by the heat decomposition. In this regard, at any stage of the polymerization reaction stage, preferably prior to the polycondensation reaction, the above-mentioned phosphorus compound, hindered phenol type antioxidant and color shade adjuster may be added.

Next, the pelletizing process will be described.

To pelletize the polymer, after the polymer has been quenched in water to be a strand or sheet form, the polymer is cut into pellets having a weight in a range from 1 to 50 mg/piece. The quenching process is carried out in a cold water preferably at 40° C. or lower, more preferably at 10° C. or lower for a period in a range from 1 to 5000 seconds to have a smooth cut surface. The cutting may be carried out either during or after the quenching.

The pellet may be of any shape such as rectangle, cylinder, dice or sphere. Of them, a cylindrical shape is the most favorable because it is easily handled and pelletized. In a case of the cylindrical shape, the pellet is preferably of a size in a range from 0.01 to 0.4 cm in cross-sectional diameter and from 0.1 to 0.6 cm in length in view of the ease of handling and the resistance to cracks.

Next, the solid-state polymerization process will be described.

PTT pellet according to the present invention is obtained by the solid-state polymerization of the prepolymer pellet thus obtained. In this regard, the solid-state polymerization is a process for increasing an intrinsic viscosity to be larger at least 0.1 dl/g than that of the prepolymer pellet by heating the solid prepolymer.

Prior to carrying out the solid-state polymerization, the pellet is preferably crystallized by heat treatment. According to this crystallization of pellet, it is possible to minimize the fluctuation of the extraction speed due the fusion bonding between the pellets. The heat treatment condition is preferably in that the a temperature reached by the pellet is in a range from 190 to 225° C. in an inert gas atmosphere and a time for which the temperature is maintained is in a range from 5 to 120 minutes. Under such heat treatment conditions, the adhesion of the melted pellet to the inside wall of the heat treatment device is prevented, the fusion bonding between the pellets is effectively also prevented, and the crystallization is sufficiently and uniformly developed without the generation of crack or powder.

To crystallize the pellet by the heat treatment while avoiding the drastic one, a preheat treatment may be carried out at a temperature in a range from 80 to 180° C. for a time in a range from 5 to 120 minutes prior to the crystallization process. The degree of crystallization of the resultant pellet is preferably in a range from 20 to 60%, more preferably from 40 to 50%.

The solid-state polymerization is preferably carried out in an inert gas stream while properly controlling a temperature and a superficial velocity of the inert gas.

To minimize the discoloration of the pellet and increase the solid-state polymerization speed, the temperature is preferably in a range from 190 to 220° C., more preferably from 195 to 215° C., most preferably 197 to 210° C. When the temperature is within this range, the solid-state polymerization speed becomes proper, and the discoloration or the excessive crystallization of the pellet is avoidable in the solid-state polymerization. Also, since no cracks or powder are generated in the pellet and therefore the powder is not fusion-bonded to the wall surface of the solid-state polymerization vessel to form a highly polymerized product or a highly crystallized product, the melting stability is good in the spinning and molding process.

The solid-state polymerization may be carried out either in an inert gas stream or in a vacuum. In either of these methods, a byproduct such as water or PDO is effectively dischargeable from the pellet surface.

First, the method carried out in the inert gas stream will be described.

The inert gas is a gas which substantially does not react with PTT at the solid-state polymerization temperature; for example, nitrogen, argon or neon. Of them, nitrogen gas is favorably used in view of the cost thereof. If oxygen is contained in the inert gas, the discoloration is accelerated due to the heat decomposition during the solid-state polymerization. Thereby, the content of oxygen is preferably 100 ppm or less relative to the inert gas.

It is necessary to pass the inert gas through the solid-state polymerization vessel in which the prepolymer pellets are loaded. In view of the solid-state polymerization speed, the superficial velocity representing a flow rate of the inert gas is 10 cm/min or more. In this respect, the superficial velocity is a value obtained by dividing a gas flow rate ($cm^3$/min) by a cross-sectional area ($cm^2$) of the solid-state polymerization vessel through which the gas passes. As the byproduct generated from the pellet, such as water or PDO is discharged from the pellet surface to the outside the solid-state polymerization vessel at a sufficiently high speed if the superficial velocity is 10 cm/min or more, the solid-state polymerization speed becomes high enough to result in a highly polymerized PTT pellet. While there is no upper limit in the superficial speed, the effect for discharging the polymerization byproduct is not so significantly improved even though exceeding 400 cm/min, whereby the superficial velocity is preferably 400 cm/min or less from an economical view point. Also, if the superficial velocity of the inert gas is large, the rubbing between the pellets is mitigated to minimize the generation of cracks or powder.

There are a method for passing through the inert gas in that the pellets are continuously fed to one side of the solid-state polymerization vessel at a constant speed while feeding the inert gas in reverse to the pellet stream, and the inert gas is continuously extracted from the vessel at the same speed as the pellet feeding speed, and a method wherein the pellets are loaded in the solid-state polymerization vessel and the inert gas is supplied at a predetermined superficial velocity while agitating the pellets. To minimize the generation of cracks or powder due to the rubbing of the pellets, the former method is preferable.

If the process is carried out in a vacuum environment, the degree of vacuum is preferably 30 kPa or lower, more preferably 20 kPa or lower, most preferably in a range from 0.001 to 10 kPa.

The solid-state polymerization vessel may be of any type, provided heat is applicable to the pellets from the inside wall. For example, a banker type vessel is preferably used, having a pellet inlet in the upper portion of a cylindrical tube and a funnel-shaped pellet exit in the lower portion and capable of supplying heat by means of heat medium or steam.

A supply speed or an extraction speed of the pellets is preferably in a range from 50 to 1000 kg/hr, more preferably from 100 to 400 kg/hr. A dwell time of the pellet in the solid-state polymerization vessel is preferably in a range from 5 to 100 hours, more preferably from 8 to 40 hours. A continuous type solid-state polymerization is favorable in comparison with a batch type one in which a constant amount of the pellets is subjected to the solid-state polymerization at one time, because of its high productivity.

After completing the solid-state polymerization, the pellets are preferably quenched. The pellet quenching is important for ceasing the progress of the solid-state polymerization so that the intrinsic viscosity of the respective pellets is prevented from fluctuating by heat inertia. There is no limitation in the quenching method, provided it uses water or others in the inert gas atmosphere to lower the pellet temperature preferably to 120° C. or lower, more preferably to 80° C. or lower.

In the present invention, a method is preferably used in view of facilitating the productivity, in which after the prepolymer pellets are crystallized by the heat treatment, the pellets are continuously supplied to the solid-state polymerization vessel and subjected to the solid-state polymerization, after which the pellets are continuously taken out and quenched. Further, it is favorable to equalize the pellet supply speed to the pellet extraction speed in view of the improvement in production efficiency and stability.

The pellet according to the present invention may be used for obtaining melt-mold product such as fiber, film or molded part by a known method.

BEST MODE FOR CARRYING OUT THE INVENTION

The present invention will be described in more detail below with reference to the preferred embodiments. However, the present invention should not be limited to these embodiments.

Methods for the measurement and evaluation are as follows:

(1) Intrinsic Viscosity

By using an Ostwald viscometer, a ratio of a specific viscosity ($\eta sp$) and a concentration (C) (g/dl) at 35° C. in o-chlorophenol ($\eta sp/C$) is obtained and the intrinsic viscosity is determined by the following equation while extrapolating the concentration to zero:

$$[\eta]=lim(\eta sp/C)$$

$$C \rightarrow 0$$

(2) Color Tone (L*, b*)

Cylindrical PTT pellets are put into a glass cell (having an inner diameter of 61 mm and a depth of 30 mm) to fill the latter to a depth in a range from 90 to 100%, and then L* and b* values are measured by using a color difference meter SM-7-CH manufactured by Suga Shikenki K.K. based on a CIE-L*a*b* color model (CIE1976).

(3) Weight of Pellet and Amount of Powder Generated from Pellet

A predetermined amount of pellets are washed with water on a 50-mesh screen to remove powdery material adhered to the pellet surface. Then, the pellets are dried in a hot air dryer and conditioned at 20° C. and 65% RH for 24 hours. The weight of 100 pellets is weighed by an electronic balance while being air-conditioned and an average value is obtained as a weight of the pellet.

Also, the powdery material passing through the 50-mesh screen is dried and air-conditioned in the same conditioned described above, and a weight of the powdery material is measured to determine an amount of the generated powder relative to the weight of pellets.

(4) Amount of Terminal Carboxyl Groups

PTT pellets of 1 g weight is dissolved in benzyl alcohol of 25 ml. After adding chloroform of 25 ml, a titer (VA)(ml) is obtained in 1/50 N potassium hydroxide benzyl alcohol solution. On the other hand, by a control titration without pellets, a titer (VO) is obtained. An amount of terminal carboxyl groups per 1 kg pellets is calculated by the following equation based on these values:

Amount of terminal carboxyl groups (milli-equivalent/kg)=(VA−VO)×20

(5) Copolymerization Ratio of BPE

Pulverized PTT pellets of 2 g weight are precisely weighed and put into 2N methanol solution of potassium hydroxide of 25 ml. Thereafter, the solution is subjected to the solventolysis under reflux for four hours. The resultant decomposition product is determined by a gas chromatography.

DURABOND (registered trade mark) DB-WAX (an inner diameter of 0.25 mm×a length of 30 m (a liquid-phase film thickness of 0.25 $\mu$m)) manufactured by Agilent Co. is used for the measurement while passing helium therethrough at a rate of 100 ml/min at a temperature rise rate of 20° C./min from 150 to 230° C.

(6) Amount of Cyclic Dimer

Pellets of 0.3 g weight are weighed, put into a mixture of hexafluoroisopropanol of 5 ml and chloroform of 5 ml and dissolved at a room temperature. After being completely dissolved, chloroform of 5 ml is added and further acetonitrile of approximately 80 ml is added. Then, the separated-out insoluble matter is filtrated and the filtrate is all transferred to a 300 ml flask and added with acetonitrile to be a transparent solution of a 200 ml total amount. This solution is analyzed by a high-speed liquid chromatography to obtain an amount of cyclic dimer.

A $\mu$-Bondasphere (a registered trade mark) 15 $\mu$C-18-100A (3.9×300 mm) manufactured by Waters Co. is used as a column, and ultraviolet light of 242 nm wavelength is used in a sensor. The measurement temperature is 45° C., and the moving phase is a mixture liquid of acetonitrile/water of 7/3 ratio and a flow rate is 1.5 ml/min.

(7) Superficial Velocity of Inert Gas

A flow rate ($cm^3$/min) of inert gas in a normal condition (0° C., 101 kPa) supplied to a solid-state polymerization vessel is divided by a cross-sectional area ($cm^2$) of the solid-state polymerization vessel through which the inert gas passes.

(8) Specific Surface Area of Pellet

A surface area (S) ($cm^2$/piece) of one pellet is measured by a BET absorption method and a specific surface area (S/W) is calculated based on a weight of the pellet (W)(g/piece) by the following equation:

$$S=\sigma \times Vm \times N$$

wherein $\sigma$ is an area occupied by one nitrogen molecule which is an absorption molecule on the pellet surface, N is an Avogadro's number, and Vm is the number of moles.

(9) Degree of Crystallization

Ten pellets are put into a direct-reading type density gradient tube prepared by a light liquid (a specific weight=1.240) and a heavy liquid (a specific weight=1.590) formed by a mixture liquid of toluene and carbontetrachloride. After 20 hours, a scale of the density gradient tube is read, and the density d is calculated by a calibration curve obtained from a float of which the density is known. Then, based on this value, the degree of crystallization is determined from the following equation:

Degree of crystallization (%)={[$dc \times (d-da)$]/[$d \times (dc-da)$]}×100 wherein dc is a density of a complete crystalline phase; 1.431 ($g/cm^3$), and da is a density of an amorphous phase; 1.305 ($g/cm^3$).

(10) Vickers Hardness

A Vickers hardness is obtained in accordance with JIS-Z-2244.

A surface of the pellet which is as smooth as possible is selected as a test surface. If a flat surface does not exist as in a case of a spherical pellet, a flat surface is formed by cutting the pellet with a sharp knife or other method.

The pellet is fastened by a jig so that a test penetrator is vertically brought into contact with the surface, and the penetrator is applied with a test pressure of 0.5 kgf to and maintained in this state for 15 seconds so that a recess is formed thereon.

After releasing the pressure, the surface is observed by an optical microscope and lengths (d1, d2) of the diagonal lines of the recess in two directions are measured. Then, the Vickers hardness is obtained by the following equation:

Vickers hardness $(kg/mm^2)=0.9272/d^2$ wherein d (mm)=(d1+d2)/2

(11) Compressive Breakage Strength

A compressive breakage strength is obtained in accordance with JIS-K-7208 (compressive breakage strength).

A cylindrical pellet having load-applying upper and lower surfaces parallel to each other is used so that a compressive load is uniformly applied. By using a Tensilon compression tester UCT-10T (manufactured by Orientech Co.), a pellet is nipped between compression jigs parallel to each other and loaded with a compressive force at a crosshead speed of 2 mm/min. A load by which the PTT pellet is broken (a yield point of stress) is obtained. This value is divided by the cross-sectional area on which the load is applied to result in the compressive breakage strength.

(12) K/S Value of Knit Fabric

A K/S value represents a surface color depth of a dye. A spectral reflectance (R) at the maximum absorption wavelength of a dyed knit fabric is measured and the K/S value is obtained by the following Kubelka-Munk's equation. The larger this value, the deeper the dyed color. In other words, the color development is favorable.

$K/S=(1-R)^2/2R$

EXAMPLE 1

BHPT was produced by the ester-interchange reaction of dimethyl terephthalate of 1300 wt parts and 1,3-propanediol of 1144 wt parts at 220° C. while using titanium tetrabutoxide of 0.98 wt parts as an ester-interchange catalyst. Trimethylphosphate of an amount corresponding to phosphorus element of 20 ppm relative to PTT to be obtained was added to the resultant BHPT. Subsequently, n-octadecyl-3-(3', 5'-di-tert-butyl-4'-hydroxyphenyl) propionate of 100 ppm relative to PTT to be obtained was added as a hindered phenol type antioxidant. Then, titanium oxide of 0.05 wt % relative to PTT to be obtained was added as a delusterant, and the polycondensation reaction was carried out at 260° C. for 3.5 hours while lowering the pressure to 0.07 kPa in 20 minutes.

The resultant polycondensate was ejected from a circular exit of 10 mm diameter into water having a temperature of approximately 5° C., cut in water, centrifugally dehydrated and dried at 130° C. for 2 hours to result in cylindrical prepolymer pellets.

The resultant prepolymer pellet had a intrinsic viscosity of 0.7 dl/g, an L* value of 80, a b* value of 1.3, an amount of terminal carboxyl groups of 21 milli-equivalent/kg, a weight of 25 mg/piece, a BPE copolymerization ratio of 0.13 wt %, an amount of cyclic dimer of 2.7 wt % and a specific surface area of 16 $cm^2/g$.

Then, the prepolymer pellets were put into a solid-state polymerization vessel, and heat-treated for 15 minutes by applying heat of 210° C. through an outside wall of the solid-state polymerization vessel while passing nitrogen gas heated at 205° C. therethrough as an inert gas at a superficial velocity of 100 cm/min (converted to a normal condition) to crystallize the pellets. As a result, the pellets having a degree of crystallization of 48% were obtained.

The crystallized pellets were heat-treated in the solid-state polymerization vessel for approximately 30 hours while passing nitrogen gas heated at 205° C. at a superficial velocity of 100 cm/min (converted to a normal condition) therethrough and applying heat of 205° C. through the outside wall. Then, cold water at 5° C. was made to flow through the outside wall of the solid-state polymerization vessel to quench the pellets for 30 minutes in the nitrogen gas atmosphere so that the pellet temperature lowered to 60° C.

The PTT pellet obtained by the solid-state polymerization had an intrinsic viscosity of 1.3 dl/g, an L* value of 82, a b* value of 3.0, an amount of terminal carboxyl groups of 13 milli-equivalent/kg, a BPE copolymerization ratio of 0.13 wt % and an amount of cyclic dimer of 0.8 wt %. The amount of a phosphorous compound and a hindered phenol type antioxidant in the PTT pellet was the same as that added when the PTT was polycondensated. An amount of powder having a size capable of passing through a 50-mesh screen, generated during the crystallization and the solid-state polymerization was approximately 100 ppm relative to an amount of PTT after the solid-state polymerization.

For the purpose of spinning, the PTT pellets were dried by air heated at 140° C. at a rate of 0.1 l/min per 1 g PTT pellet for three hours, after which the color tone of the pellet was measured. As a result, the L* value was 81 and the b* value was 3.2, which means that the color tone is hardly changed and the pellet is excellent in antioxidation stability. This pellet was high in polymerization degree and excellent in whiteness as well as less in loss due to crack during the solid-state polymerization. Also, the pellet had a compressive breakage strength as high as 1200 $kg/cm^2$ and was hardly cracked.

The spinning, knitting and molding were carried out by using the resultant PTT pellets as follows and the products were evaluated.

The PTT pellets were dried in a nitrogen gas stream at 130° C. to have a moisture content of 30 ppm. The pellets were put into an extruder and extruded at 265° C. through a spinneret having 36 circular orifices of 0.23 mm diameter. There was no fluctuation in a screw pressure and the spinning operation was smoothly carried out. Filaments extruded from the spinneret were quenched and solidified by a cold air having a temperature of 20° C. and a relative humidity of 90% blowing at a rate of 0.4 m/sec. The solidified filaments were applied with a finishing agent and taken up at a speed of 1600 m/min to result in an undrawn yarn. Then, the resultant undrawn yarn was drawn through a hot roll at 55° C. and a hot plate at 140° C. so that an elongation is approximately 40% to obtain a drawn yarn of 50 dtex/36 f. The resultant yarn was high in whiteness and had a strength of 4.2 cN/dtex and an elastic modulus as low as 25 cN/dtex, which was very soft and high in stretchability.

A fabric was knit from the resultant yarn by using a single yarn guide. The fabric was scoured at 90° C. for 20 minutes in hot water containing Scourol FC-250 (a registered trade mark of kAO K.K.) at a ratio of 2 g/l, and preset after being dehydrated by a centrifugal force at 180° C. for 30 seconds. Then, the fabric was dyed in a dyeing bath of a dye Dianix Blue AC-E (a registered trade mark of DAISTARS JAPAN (K.K.) of 0.05% owf and a dispersant NIKKA SUNSALT 7000 (a registered trade mark of NITTA KAGAKU (K.K.)) of 1 g/l, of which pH was adjusted to 5.5 with acetic acid and sodium acetate. The dyeing operation was carried out at a bath ratio of 1:50 at 120° C. for 30 minutes to result in the dye exhaustion ratio of 98%. Then the fabric was dehydrated and subjected to a final set by a pin tenter at 170° C. for 30 seconds. Thus, the knit fabric dyed in pale blue having a high color clearness was obtained. The K/S value of the knit fabric was 0.7 and the b* value was −14.

Alternatively, the pellets dried to have the moisture content of 30 ppm described before were put into an extruder and injected into a mold at 245° C. to obtain an injection-mold product. The color tone of the resultant mold product was excellent in whiteness and favorable.

EXAMPLE 2

Except that the solid-state polymerization time was changed to 10 hours, the same steps as in Example 1 were repeated to result in PTT pellets. The obtained PTT pellets had an intrinsic viscosity of 0.9 dl/g, an L* value of 81, a b* value of 2.2, an amount of terminal carboxyl groups of 15 milli-equivalent/kg, a BPE copolymerization ratio of 0.13 wt % and an amount of cyclic dimer of 1.0 wt %.

An amount of powder generated in the crystallization treatment and the solid-state polymerization and passing through a 50-mesh screen was approximately 50 ppm relative to an amount of PTT pellets, and the generation of cracks and powder was less in these PTT pellets. The pellets were hardly discolored by the drying heat treatment at 140° C. for 3 hours as in Example 1.

EXAMPLE 3

Except that the hindered phenol type antioxidant was not added in the process for producing the prepolymer pellets, the same steps as in Example 1 were repeated to result in PTT pellets. The obtained PTT pellets had an intrinsic viscosity of 1.3 dl/g, an L* value of 83, a b* value of 3.2, an amount of terminal carboxyl groups of 15 milli-equivalent/kg, a BPE copolymerization ratio of 0.14 wt % and an amount of cyclic dimer of 0.8 wt %.

An amount of powder generated in the crystallization treatment and the solid-state polymerization and passing through a 50-mesh screen was approximately 100 ppm relative to an amount of PTT pellets, and the generation of crack and powder was less in these PTT pellets. By the drying heat treatment at 140° C. for 3 hours as in Example 1, the color tone of the pellets were such that the L* value was 82 and the b* value was 4.4, whereby the discoloration was very slight.

EXAMPLE 4

In the process for producing the PTT pellets in Example 1, the crystallization, solid-state polymerization and quenching of the prepolymer pellets were carried out while continuously supplying and discharging the pellets at a constant rate of 200 kg/hr. As a result, a time required for completing a series of steps was 33 hours in this Example because of the continuous system, while in Example 1, which was a batch system, the time was 31 hours. This means that the productivity was improved.

EXAMPLE 5

In the process for producing the prepolymer pellets in Example 1, the cutting condition was changed to obtain prepolymer pellets having a weight of 10 mg/piece and a specific surface area of 22 cm$^2$/g. There was substantially no difference in an intrinsic viscosity, an amount of terminal carboxyl groups and a BPE copolymerization ratio of the pellet from those obtained by Example 1.

The prepolymer pellets were subjected to the solid-state polymerization under the same condition as in Example 1 to result in PTT pellets in a solid-state polymerization time as short as approximately 16 hours, having an intrinsic viscosity of 1.3 dl/g, an L* value of 85, a b* value of 2.1, an amount of terminal carboxyl groups of 12 milli-equivalent/kg, a BPE copolymerization ratio of 0.13 wt % and an amount of cyclic dimer of 0.7 wt %. The PTT pellet had a higher degree of whiteness and a smaller amount of terminal carboxyl groups than that obtained in Example 1.

An amount of powder generated in the crystallization treatment and the solid-state polymerization and passing through a 50-mesh screen was extremely as small as approximately 40 ppm relative to an amount of PTT pellets due to a short solid-state polymerization time, whereby the PTT pellets thus obtained were less in generation of crack and powder. Also, since an amount of terminal carboxyl groups was somewhat smaller than in Example 1, the pellet had a favorable color tone in that an L* value is 84 and a b* value is 2.2 and was hardly discolored.

Next, the spinning was carried out in the same manner as in Example 1 while using the above-mentioned PTT pellets. The resultant yarn was extremely high in whiteness. A fabric was knit from the resultant yarn by using a single yarn guide, which was then dyed and set in the same manner as in Example 1. The resultant fabric was dyed in pale blue and had a K/S value of 0.8, a b* value of −20. The clearness of the blue color further increased than that obtained by Example 1.

The injection molding was carried out in the same manner as in Example 1 to obtain a mold product. The resultant mold product was further high in whiteness than that obtained in Example 1.

EXAMPLES 6 AND 7

In the process for producing the prepolymer pellets in Example 1, the cutting condition was changed to obtain prepolymer pellets having a weight of 43 mg/piece and 15 mg/piece as shown in Table 1. Then, in the same manner as in Example 1, these pellets were subjected to the solid-state polymerization for approximately 40 hours and 20 hours, respectively. The resultant PTT pellets were excellent in whiteness and antioxidation properties and low in generation of cracks and powder.

EXAMPLE 8

In the process for producing the prepolymer pellets in Example 1, a diameter of a takeout hole of the polycondensation apparatus was reduced and the cutting condition was changed to result in prepolymer pellets having a weight of 3 mg/piece. Then, in the same manner as in Example 1, the solid-state polymerization was carried out for approximately 10 hours. The resultant PTT pellets were excellent in whiteness and antioxidation stability and less in generation of crack and powder.

EXAMPLE 9

In the process for producing the prepolymer in Example 1, the polycondensation was finished after 2.5 hours has passed to result in the prepolymer pellets. Then, the solid-state polymerization was carried out for 50 hours in the same manner as in Example 1. The resultant PTT pellets were excellent in whiteness and antioxidation stability and low in generation of cracks and powder.

EXAMPLES 10 AND 11

Except that the flow rate and the superficial velocity of nitrogen gas were changed to 350 cm/min and 20 cm/min, respectively, in the solid-state polymerization, the same steps were repeated as in Example 1 to result in PTT pellets. The resultant PTT pellets were excellent in whiteness and antioxidation stability and low in generation of cracks and powder.

COMPARATIVE EXAMPLE 1

In the process for producing the prepolymer pellets in Example 1, the cutting speed was changed to obtain prepolymer pellets having an intrinsic viscosity of 0.7 dl/g, an L* value of 79, a b* value of 1.8, an amount of terminal carboxyl groups of 23 milli-equivalent/kg, a pellet weight of 60 mg/piece, a specific surface area of 10 cm$^2$/g, a BPE copolymerization ratio of 0.13 wt % and an amount of cyclic dimer of 2.7 wt %.

When the resultant prepolymer pellets were subjected to the solid-state polymerization in the same manner as in Example 1, approximately 60 hours was required for reaching a predetermined intrinsic viscosity. Since the solid-state polymerization time was extremely long, the resultant PTT pellets had a low degree of whiteness and the loss due to cracks in the solid-state polymerization was also very large. The compressive breakage strength and the antioxidation stability were also low.

Next, the spinning was carried out by using the obtained PTT pellets in the same manner as in Example 1, but the resultant yarn was somewhat yellowish. A fabric was knit from this yarn by using a single yarn guide, which was then dyed and set in the same manner as in Example 1. The resultant fabric was dyed in pale blue and had a K/S value of 0.6 and a b* value of −10, which was more yellowish than that obtained in Example 1 and the clearness of color tone was unfavorable.

The injection molding was carried out in the same manner as in Example 1 to obtain a mold product. The resultant mold product was more yellowish than that obtained in Example 1 and the clearness of color tone was unfavorable.

COMPARATIVE EXAMPLE 2

In the process for producing the prepolymer pellets in Example 1, the polycondensation was carried out at a temperature of 285° C. to obtain prepolymer pellets having an intrinsic viscosity of 0.7 dl/g, an L* value of 74, a b* value of 7.0, an amount of terminal carboxyl groups of 48 milli-equivalent/kg, a pellet weight of 25 mg/piece, a BPE copolymerization ratio of 0.70 wt % and an amount of cyclic dimer of 2.9 wt %. The pellet was yellowish and dull in color clearness.

When the resultant prepolymer pellets were subjected to the solid-state polymerization in the same manner as in Example 1, approximately 70 hours was required until the solid-state polymerization has been completed. Since the resultant PTT pellets were rich in terminal carboxyl groups, the discoloration was significant and also the discoloration due to the drying heat treatment was significant. The resultant PTT pellets were also low in antioxidation stability.

COMPARATIVE EXAMPLE 3

In the process for producing the prepolymer pellets in Example 1, the polycondensation was carried out for 7 hours to obtain prepolymer pellets having an intrinsic viscosity of 0.73 dl/g, an L* value of 70, a b* value of 8.3, an amount of terminal carboxyl groups of 52 milli-equivalent/kg, a pellet weight of 25 mg/piece, a BPE copolymerization ratio of 0.75 wt % and an amount of cyclic dimer of 2.9 wt %. The pellet was yellowish and dull in color clearness.

When the solid-state polymerization was carried out in the same manner as in Example 1, approximately 90 hours was required until the solid-state polymerization has been completed. Since the resultant PTT pellets were rich in terminal carboxyl groups as shown in Table 1, the discoloration of the pellet was significant and also the discoloration due to the drying heat treatment was significant. The resultant PTT pellets were also low in antioxidation stability.

COMPARATIVE EXAMPLE 4

In the process for producing PTT pellets in Example 1, the solid-state polymerization was carried out in the same manner as in Example 1 except that the solid-state polymerization temperature was changed to 160° C. However, the resultant PTT pellets had, even after the solid-state polymerization of approximately 60 hours, an intrinsic viscosity of 0.72 dl/g, an L* value of 81, a b* value of 4.0, an amount of terminal carboxyl groups of 18 milli-equivalent/kg, a BPE copolymerization ratio of 0.13 wt % and an amount of cyclic dimer of 2.0 wt %. Therefore, the pellets were unsatisfactory in intrinsic viscosity, amount of cyclic dimer and other qualities.

COMPARATIVE EXAMPLE 5

In the process for producing PTT pellets in Example 1, the solid-state polymerization was carried out in the same manner as in Example 1 except that the solid-state polymerization temperature was changed to 225° C. to result in PTT pellets shown in Table 1. The obtained PTT pellets were significant in discoloration even though the solid-state polymerization time is short, and also the discoloration due to the drying heat treatment was significant. The compressive breakage strength and the antioxidation stability were also low.

COMPARATIVE EXAMPLE 6

In the process for producing PTT pellets in Example 1, the solid-state polymerization was carried out in the same manner as in Example 1 except that the flow rate of nitrogen gas in the solid-state polymerization was changed to 1 cm/min as represented by the superficial velocity to result in PTT pellets shown in Table 1. As the transportation of PDO to the outside of the solid-state polymerization apparatus was insufficient, the polymerization was difficult to proceed and the PTT pellets obtained by the solid-state polymerization of approximately 60 hours had an intrinsic viscosity of 0.75 dl/g, an L* value of 71, a b* value of 6.5, an amount of terminal carboxyl groups of 26 milli-equivalent/kg, a BPE copolymerization ratio of 0.25 wt % and an amount of cyclic dimer of 1.8 wt % and were significantly discolored. Also, the compressive breakage strength and the antioxidation stability were low.

COMPARATIVE EXAMPLE 7

It was attempted to obtain prepolymer pellets having a weight of 0.6 mg/piece by reducing a diameter of a takeout hole of the polycondensation apparatus and changing the cutting condition in the process for producing the prepolymer pellets in Example 1. However, the cutting could not be smoothly carried out to result in the significant variation in weight of individual pellets.

COMPARATIVE EXAMPLE 8

BHPT was produced by the ester-interchange reaction of terephthalic acid of 1100 wt parts and 1,3-propanediol of 1700 wt parts at 250° C. while using titanium tetrabutoxide of 0.98 wt parts as an ester-interchange catalyst. Trimethylphosphate of an amount corresponding to phosphorus element of 20 ppm relative to PTT to be obtained was added to the resultant BHPT. Subsequently, n-octadecyl-3-(3', 5'-di-tert-butyl-4'-hydroxyphenyl) propionate of 100 ppm relative to PTT to be obtained was added as a hindered phenol type antioxidant. Then, the polycondensation reaction was carried out at 260° C. for 3.5 hours while lowering the pressure to 0.07 kPa in one hour to result in a polycondensate. Then, the resultant polycondensate was ejected from a circular exit of 10 mm diameter into water having a temperature of approximately 5° C., cut in water, centrifugally dehydrated and dried at 130° C. for 2 hours to result in cylindrical prepolymer pellets.

The resultant prepolymer pellet had a intrinsic viscosity of 0.7 dl/g, an L* value of 81, a b* value of 6.3, an amount of terminal carboxyl groups of 38 milli-equivalent/kg, a weight of 25 mg/piece, a BPE copolymerization ratio of 2.12 wt %, an amount of cyclic dimer of 2.7 wt % and a specific surface area of 16 cm$^2$/g.

The prepolymer pellets were subjected to the solid-state polymerization to obtain PTT pellets. The resultant PTT pellets were inferior in degree of whiteness and antioxidation stability.

Characteristic values of the prepolymer pellets and the solid-state polymerization conditions and characteristic values of the PTT pellets obtained by the above-mentioned Examples and Comparative examples are shown in Tables 1 and 2, respectively.

TABLE 1

| | Prepolymer | | | | | |
|---|---|---|---|---|---|---|
| | [η] (dl/g) | Color shade L*/b* | Weight (mg/piece) | Terminal COOH (milli-equivalent/kg) | BPE copolymerization ratio (wt %) | Amount of cyclic dimer (wt %) |
| Example 1 | 0.7 | 80/1.3 | 25 | 21 | 0.13 | 2.7 |
| Example 2 | 0.7 | 80/1.3 | 25 | 21 | 0.13 | 2.7 |
| Example 3 | 0.7 | 81/1.5 | 25 | 24 | 0.14 | 2.8 |
| Example 4 | 0.7 | 80/1.3 | 25 | 21 | 0.13 | 2.7 |
| Example 5 | 0.7 | 81/1.4 | 10 | 21 | 0.13 | 2.7 |
| Example 6 | 0.7 | 80/2.0 | 43 | 22 | 0.13 | 2.7 |
| Example 7 | 0.7 | 80/1.5 | 15 | 21 | 0.13 | 2.7 |
| Example 8 | 0.7 | 83/2.2 | 3 | 21 | 0.13 | 2.7 |
| Example 9 | 0.6 | 85/−1 | 25 | 12 | 0.10 | 2.3 |
| Example 10 | 0.7 | 80/1.3 | 25 | 21 | 0.13 | 2.7 |
| Example 11 | 0.7 | 80/1.3 | 25 | 21 | 0.13 | 2.7 |
| Comparative example 1 | 0.7 | 79/1.8 | 60 | 23 | 0.13 | 2.7 |
| Comparative example 2 | 0.7 | 74/7.0 | 25 | 48 | 0.70 | 2.9 |
| Comparative example 3 | 0.73 | 70/8.3 | 25 | 52 | 0.75 | 2.9 |
| Comparative example 4 | 0.7 | 80/1.3 | 25 | 21 | 0.13 | 2.7 |
| Comparative example 5 | 0.7 | 80/1.3 | 25 | 21 | 0.13 | 2.7 |
| Comparative example 6 | 0.7 | 80/1.3 | 25 | 21 | 0.13 | 2.7 |
| Comparative example 8 | 0.7 | 81/6.3 | 25 | 38 | 2.13 | 2.7 |

Note:
Terminal COOH: an amount of terminal carboxyl groups
Cyclic dimer: trimethylene terephthalate cyclic dimer

TABLE 2

| | Solid-state polymerization conditions | | | | | PTT pellet | | | | | | | | |
|---|---|---|---|---|---|---|---|---|---|---|---|---|---|---|
| | Temperature (° C.) | Superficial velocity (cm/min) | Time (hr) | [η] (dl/g) | Color Shade L*/b* | Weight (mg/piece) | Terminal COOH (milli-equivalent/kg) | BPE copolymerization ratio (wt %) | Amount of cyclic dimer (wt %) | Specific surface area (cm²/g) | Degree of crystallization (%) | Amount of powder (ppm) | Compressive breakage strength (kg/cm²) | Color shade after dry L*/b* | Vickers hardness (kg/mm²) |
| Example 1 | 205 | 100 | 30 | 1.3 | 82/3.0 | 25 | 13 | 0.13 | 0.8 | 16 | 49 | 100 | 1200 | 81/3.2 | 22 |
| Example 2 | 205 | 100 | 10 | 0.9 | 81/2.2 | 25 | 15 | 0.13 | 1.0 | 16 | 47 | 50 | 1300 | 80/3.0 | 21 |
| Example 3 | 205 | 100 | 30 | 1.3 | 83/3.2 | 25 | 15 | 0.14 | 0.8 | 16 | 49 | 100 | 1220 | 82/3.4 | 22 |
| Example 4 | 205 | 100 | 30 | 1.3 | 82/2.8 | 25 | 13 | 0.13 | 0.8 | 16 | 49 | 80 | 1200 | 81/3.1 | 22 |
| Example 5 | 205 | 100 | 16 | 1.3 | 85/2.1 | 10 | 12 | 0.13 | 0.7 | 22 | 49 | 40 | 1250 | 84/2.2 | 21 |
| Example 6 | 205 | 100 | 40 | 1.3 | 78/4.2 | 43 | 23 | 0.13 | 0.8 | 12 | 50 | 500 | 1000 | 77/5.0 | 23 |
| Example 7 | 205 | 100 | 20 | 1.3 | 84/2.3 | 15 | 13 | 0.13 | 0.8 | 20 | 48 | 55 | 1400 | 83/2.2 | 22 |
| Example 8 | 205 | 100 | 10 | 1.3 | 85/2.4 | 2 | 17 | 0.13 | 0.9 | 28 | 47 | 300 | 1450 | 84/2.2 | 22 |
| Example 9 | 205 | 100 | 50 | 1.3 | 86/1.2 | 24 | 9 | 0.10 | 0.7 | 17 | 56 | 300 | 1000 | 85/1.5 | 24 |
| Example 10 | 205 | 350 | 28 | 1.3 | 83/2.7 | 25 | 12 | 0.13 | 0.8 | 16 | 48 | 100 | 1250 | 81/3.2 | 22 |
| Example 11 | 205 | 20 | 40 | 1.3 | 80/3.2 | 24 | 12 | 0.13 | 0.8 | 17 | 50 | 300 | 1100 | 79/3.0 | 23 |
| Comparative example 1 | 205 | 100 | 60 | 1.3 | 73/7.2 | 58 | 26 | 0.14 | 0.9 | 10 | 51 | 2000 | 800 | 72/9.0 | 26 |
| Comparative example 2 | 205 | 100 | 70 | 1.3 | 71/9.5 | 24 | 27 | 0.71 | 1.2 | 16 | 49 | 1200 | 1200 | 67/11.0 | 25 |
| Comparative example 3 | 205 | 100 | 90 | 1.3 | 73/11.5 | 23 | 32 | 0.77 | 1.3 | 16 | 48 | 1500 | 1100 | 70/13.2 | 31 |
| Comparative Example 4 | 160 | 100 | 60 | 0.72 | 81/4.0 | 24 | 18 | 0.13 | 2.0 | 16 | 47 | 1000 | 1200 | 80/4.5 | 20 |
| Comparative Example 5 | 225 | 100 | 23 | 1.3 | 70/10.8 | 25 | 27 | 0.18 | 1.6 | 16 | 53 | 90 | 800 | 68/12.5 | 28 |
| Comparative Example 6 | 205 | 1 | 60 | 0.75 | 71/6.5 | 24 | 26 | 0.25 | 1.8 | 16 | 52 | 1300 | 800 | 69/8.2 | 20 |
| Comparative Example 8 | 205 | 100 | 30 | 1.26 | 81/5.2 | 25 | 28 | 2.14 | 1.2 | 16 | 48 | 700 | 1300 | 69/9.6 | 21 |

Note:
Terminal COOH: an amount of terminal carboxyl groups
Cyclic dimer: trimethylene terephthalate cyclic dimer

CAPABILITY OF EXPLOITATION IN INDUSTRY

The PTT pellets according to the present invention is high in polymerization degree and excellent in color tone. Also, the generation of crack and powder is far less than those obtained in the prior art and the melt-moldability is favorable. Thus, the pellets are suitably used in various fields such as fiber, film or molded products.

What is claimed is:

1. A poly(trimethylene terephthalate) pellet comprising 80 wt % or more of trimethylene terephthalate repeating units copolymerized with bis(3-hydroxypropyl) ether at a ratio in a range of from 0.01 to 2 wt %, wherein the poly(trimethylene terephthalate) pellet has an amount of terminal carboxyl groups of 25 milli-equivalent/kg or less and an intrinsic viscosity in a range from 0.8 to 2 dl/g, said pellet having an $L^*$ value of 75 or more, a $b^*$ value in a range of from −2 to 5, and a weight in a range of from 1 to 50 mg/piece.

2. The poly(trimethylene terephthalate) pellet of claim 1, wherein the content of trimethylene terephthalate cyclic dimer is 1.5 wt % or less.

3. The poly(trimethylene terephthalate) pellet of claim 1, wherein a specific surface area per a piece of the pellet is in a range from 10 to 50 $cm^2/g$.

4. The poly(trimethylene terephthalate) pellet of claim 1, wherein a degree of crystallization is in a range of from 40 to 60%.

5. The poly(trimethylene terephthalate) pellet of claim 1, wherein a Vickers hardness is in a range from 10 to 30 $kg/mm^2$.

6. A method for producing a poly(trimethylene terephthalate) pellet comprising polymerizing by solid-phase polymerization a poly(trimethylene terephthalate) prepolymer pellet at a temperature of 190 to 210° C., the prepolymer pellet having 80 wt % or more of trimethylene terephthalate repeating units copolymerized with bis(3-hydroxypropyl) ether at a ratio in a range of from 0.01 to 2 wt %, wherein the prepolymer pellet has an amount of terminal carboxyl groups of 35 milli-equivalent/kg or less and an intrinsic viscosity in a range from 0.1 to 1 d/g, said prepolymer pellet having an $L^*$ value of 75 or more, a $b^*$ value in a range of from −3 to 6, and a weight in a range of from 1 to 50 mg/piece.

7. The method for producing a poly(trimethylene terephthalate) pellet of claim 6, wherein the solid-phase polymerization is carried out in an inert gas stream under a superficial velocity of inert gas of 10 cm/min or more.

8. The method for producing a poly(trimethylene terephthalate) pellet of claim 6, wherein the solid-phase polymerization is carried out at a negative pressure under a degree of vacuum of 30 kPa or less.

9. A method for producing a poly(trimethylene terephthalate) pellet of claim 6, wherein the solid-phase polymerization is carried out after a degree of crystallization in a range from 20 to 60% is obtained.

10. The method for producing a poly(trimethylene terephthalate) pellet of any one of claims 6 to 9, wherein the solid-phase polymerization is of a continuous type or a batch type.

11. A melt-mold product obtained from a poly(trimethylene terephthalate) pellet defined by any one of claims 1 to 5.

* * * * *